United States Patent
Griffiths et al.

(10) Patent No.: US 8,104,249 B2
(45) Date of Patent: Jan. 31, 2012

(54) ALIGNMENT PIN FOR AESTHETIC COVER ASSEMBLY AND METHOD

(75) Inventors: Robert T. Griffiths, Elk River, MN (US); Wayne Wagner, West St. Paul, MN (US); Jacob R. Sandquist, Fridley, MN (US); Robert J. Albert, Maplewood, MN (US)

(73) Assignee: Firestone Building Products Company, LLC, Indianapolis, IN (US)

(*) Notice: Subject to any disclaimer, the term of this patent is extended or adjusted under 35 U.S.C. 154(b) by 359 days.

(21) Appl. No.: 12/336,021

(22) Filed: Dec. 16, 2008

(65) Prior Publication Data

US 2010/0146901 A1 Jun. 17, 2010

(51) Int. Cl.
*E04C 3/00* (2006.01)
*F16L 9/00* (2006.01)

(52) U.S. Cl. ............... 52/834; 52/835; 52/844; 52/845; 52/745.07; 138/162; 138/155

(58) Field of Classification Search ............... 52/745.17, 52/745.19, 220.1, 220.8, 83–84, 834–835, 52/843–845, 854, 847, 36.6, 220.5, 245, 52/302.5; 138/157, 162, 165–166, 169, 155; 256/DIG. 5

See application file for complete search history.

(56) References Cited

U.S. PATENT DOCUMENTS

| | | | |
|---|---|---|---|
| 3,459,234 A * | 8/1969 | Sauter et al. | 138/165 |
| 4,845,912 A * | 7/1989 | Baker | 52/506.09 |
| 5,881,528 A * | 3/1999 | Grewe et al. | 52/834 |
| 6,009,683 A * | 1/2000 | Grewe et al. | 52/834 |
| 6,148,585 A * | 11/2000 | Baker | 52/834 |
| 6,192,646 B1 * | 2/2001 | Grewe et al. | 52/834 |
| 6,391,414 B1 * | 5/2002 | Hjertman et al. | 428/36.9 |
| 2010/0283498 A1 * | 11/2010 | Gulzow et al. | 324/763.01 |

* cited by examiner

*Primary Examiner* — Jeanette E. Chapman
(74) *Attorney, Agent, or Firm* — Jason A. Houser; Fay Sharpe LLP

(57) ABSTRACT

An aesthetic cover assembly includes first mounting portion of a cover wall for concealing a portion of a building structure that is secured to the building structure. An alignment pin is secured on one of the first mounting portions and the building structure. The alignment pin supports a second mounting portion of a cover wall for concealing a portion of the building structure. A method of installing an aesthetic cover assembly is also included.

18 Claims, 5 Drawing Sheets

ALIGNMENT PIN FOR AESTHETIC COVER ASSEMBLY AND METHOD

BACKGROUND

The subject matter of the present disclosure broadly relates to the art of building structures and, more particularly, to an alignment pin and aesthetic cover assembly for concealing a portion of a building structure as well as a method of installing the same.

Aesthetic cover assemblies are well known and commonly used for concealing features and elements of buildings and/or other structures to thereby enhance the appearance thereof. Such features and elements commonly include vertical supports (e.g., columns), horizontal supports (e.g., beams), mechanical components (e.g., ductwork and piping) and electrical components (e.g., cables and conduit) or any combination of these and/or other features and/or elements. Additionally, such aesthetic cover assemblies are known to be used in both indoor and outdoor environments.

Conventional aesthetic cover assemblies normally include one or more cover segments that are interconnected with one another. The cover segments normally include one or more cover walls that extend along or around a portion of a building structure to at least partially conceal the same. Typically, edge portions of the one or more cover walls are interconnected with one another at joints to form the cover segments. Conventional threaded fasteners are commonly used to secure adjacent edges to one another and thereby form the joint or joints of the cover segments.

Notwithstanding the usage and overall success of known cover assemblies, it is believed desirable to continue to develop and improve the design and construction of aesthetic cover assemblies and methods of installing the same, such as, for example, to provide improved cosmetic appearance (i.e., fit and finish), ease of installation and reduced installation costs (i.e., field assembly) and/or decreased manufacturing costs.

BRIEF SUMMARY

An alignment pin in accordance with the subject matter of the present disclosure that is adapted to support a mounting portion of an aesthetic cover on a building structure is provided that includes an elongated body extending between opposing first and second ends. The elongated body includes a first body portion and a second body portion. The first body portion is disposed toward the first end and has a first outside cross-sectional dimension. The second body portion is disposed toward the second end and has a second outside cross-sectional dimension. The first outside cross-sectional dimension is less than the second outside cross-sectional dimension such that a shoulder is formed between the first and second portions of the elongated body. A plurality of helical threads is formed on the first portion of the elongated body toward the first end thereof. At least one engagement feature is disposed on the elongated body adjacent the shoulder for use in rotating the alignment pin.

An aesthetic cover assembly in accordance with the subject matter of the present disclosure is provided for concealing a portion of an associated building structure. The aesthetic cover assembly includes a first mounting portion of a cover wall that secured to the associated building structure and a first securement feature that is disposed along one of the first mounting portion and the associated building structure. An alignment pin includes an elongated body that extends between opposing first and second ends. The elongated body includes a first portion disposed toward the first end and a second portion disposed toward the second end with respect to the first portion. The elongated body also includes a second securement feature disposed along the first portion and that is cooperative with the first securement feature. The first portion of the elongated body has a first outside cross-sectional dimension and the second portion of the elongated body has a second outside cross-sectional dimension that is greater than the first outside cross-sectional dimension such that a shoulder is formed therebetween. A second mounting portion of a cover wall includes an opening extending therethrough and adapted to receive the alignment pin. The alignment pin is received on the one of the first mounting portion of a cover wall and the associated building structure with the first and second securement features interengaging one another such that the alignment pin extends away from the first mounting portion of a cover wall and the shoulder is spaced a distance from the first mounting portion of a cover wall.

A method of installing an aesthetic cover assembly on a building structure is provided in accordance with the subject matter of the present disclosure that includes providing a first mounting portion of a cover wall and securing the first mounting portion to the building structure. The method also includes providing an alignment pin that includes an elongated body with a first portion and a second portion. The first portion has a first cross-sectional dimension and the second portion has a second cross-sectional dimension that is greater than the first cross-sectional dimension such that a shoulder is formed therebetween. The method further includes installing the alignment pin on one of the first mounting portion and the building structure such that the shoulder is disposed a distance from the first mounting portion. The method also includes providing a second mounting portion of a cover wall and positioning the second mounting portion on the alignment pin such that the second mounting portion is adjacent the first mounting portion. The method further includes identifying a direction for adjustment of the distance of the shoulder from the first mounting portion, and moving the second mounting portion along the adjustment pin into spaced relation with the first mounting portion such that a gap is formed between the first and second mounting portions. The method also includes adjusting the distance of the shoulder from the first mounting portion while the second mounting portion is supported on the alignment pin. And, the method further includes positioning the second mounting portion between the first mounting portion wall and the shoulder of the alignment pin.

DETAILED DESCRIPTION

Turning now to the drawings, it is to be understood that the showings are for purposes of illustrating exemplary embodiments only and are not intended to be limiting. Additionally, it will be appreciated that the drawings are not to scale and that portions of certain elements may be exaggerated for the purpose of clarity and ease of illustration.

With reference to FIGS. 1-6, one exemplary embodiment of an aesthetic cover assembly 100 is shown supported along an associated building structure. It will be appreciated that an aesthetic cover assembly, such as cover assembly 100, for example, can be of any suitable size, shape, arrangement and/or configuration. For example, an aesthetic cover assembly can be of any suitable height, length, width and/or diameter. Additionally, the outer form or shape of an aesthetic cover assembly can be approximately planar (e.g., an approximately flat wall section), curvilinear (e.g., cylindrical or frustoconical), polygonal (e.g., square, triangular or rectangular) or any combination of these and/or other shapes or forms.

Figure 1:
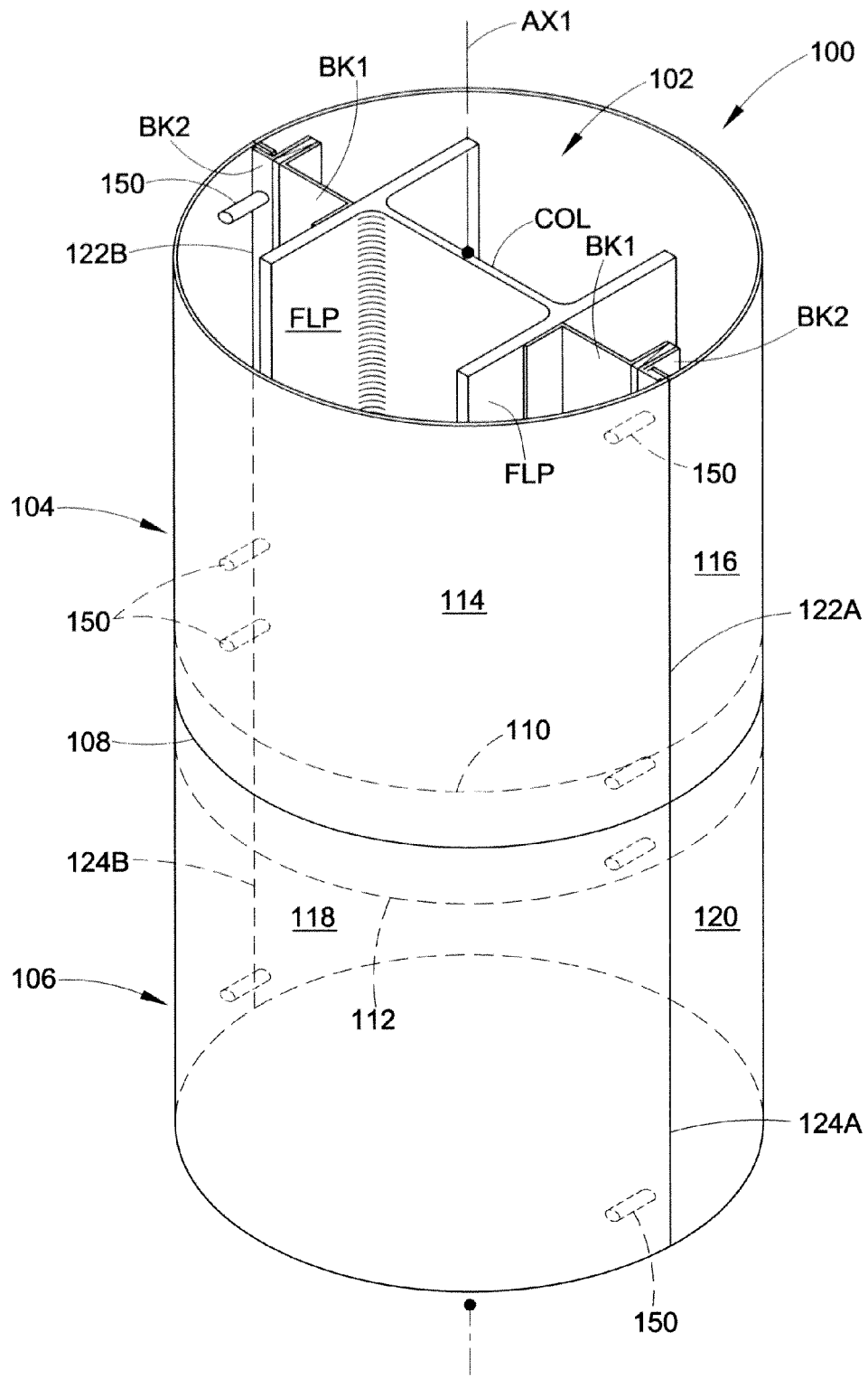
FIG. 1 is a perspective view of one example of an aesthetic cover assembly in accordance with the subject matter of the present disclosure shown concealing a portion of a building structure.
Figure 2:
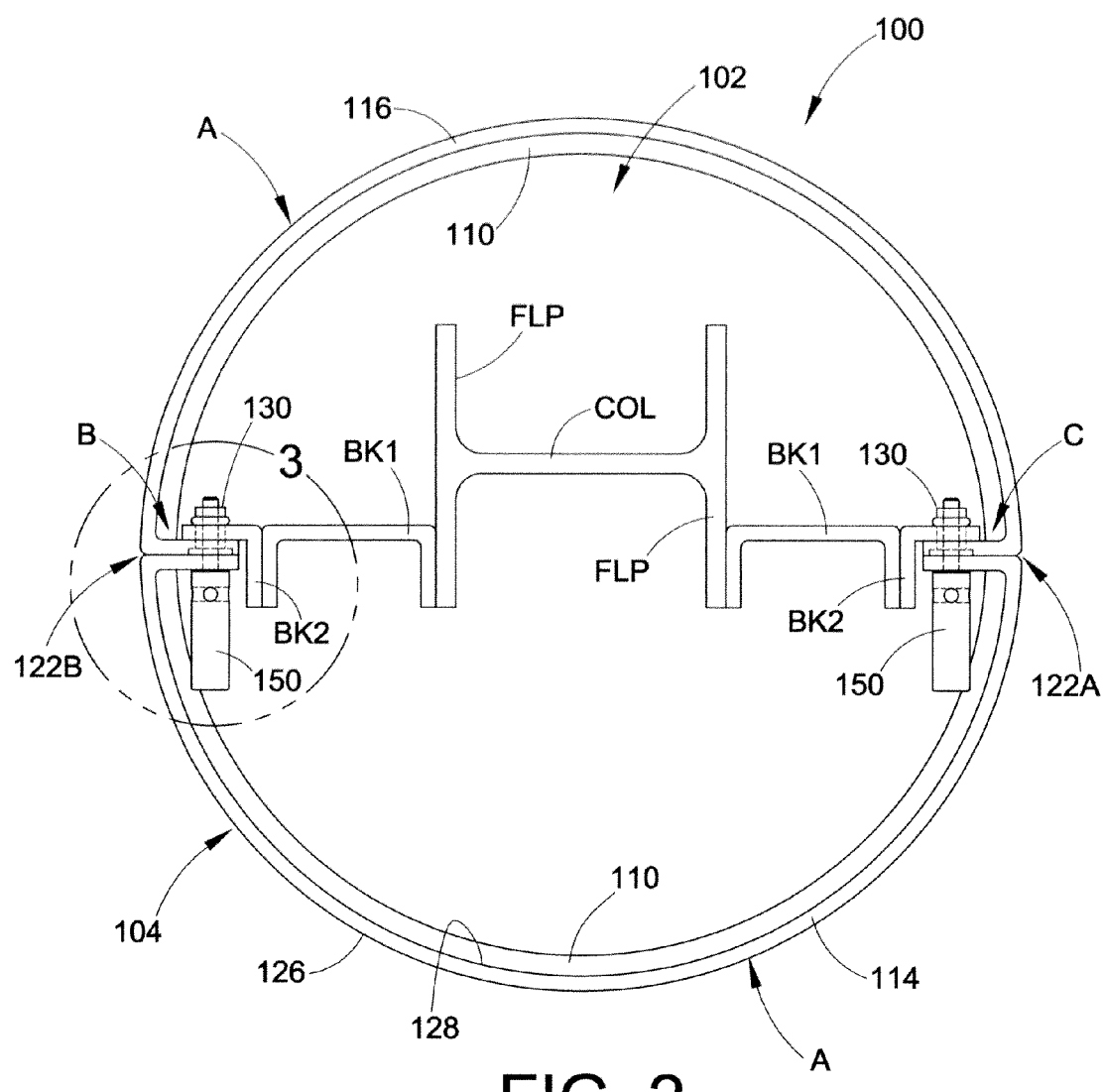
FIG. 2 is a top view of the aesthetic cover assembly and building structure shown in FIG. 1.

In the exemplary arrangement in FIGS. 1 and 2, aesthetic cover assembly 100 is shown as being approximately cylindrical and extending longitudinally along an associated building structure, as indicated by longitudinally-extending axis AX1. As discussed above, associated building structures of a great variety of types and kinds may be fully or partially concealed by an aesthetic cover assembly in accordance with the subject matter of the present application, such as structural elements (e.g., walls, columns and beams) and non-structural elements (e.g., plumbing lines, ductwork and electrical conduits). In the exemplary arrangement shown in FIGS. 1 and 2, aesthetic cover assembly 100 forms a cover cavity 102 that conceals a structural column COL, which takes the form of an I-beam. Typically, aesthetic covers are secured to one or more of the components, elements or structural features that are concealed thereby, such as by using one or more mounting brackets, for example. In the exemplary arrangement shown, first mounting brackets BK1 are secured on opposing flange portions FLP of structural column COL. Second mounting brackets BK2 can, optionally, be secured to first mounting brackets BK1 in any suitable manner, such as by using one or more fasteners FST (FIG. 3), for example. In such case, the assembled mounting brackets extend outwardly from the building structure and are adapted for engagement by cover assembly 100. It will be appreciated that mounting brackets BK1 and/or BK2 can be secured on the building structure (e.g., structural column COL) in any suitable manner, such as may be known in the art.

As indicated above, an aesthetic cover assembly in accordance with the subject matter of the present disclosure can be of any desired length or height and, as such, can include any number of one or more segments of any suitable length or dimension. In the exemplary arrangement shown in FIG. 1, aesthetic cover assembly 100 includes a first segment 104 and an optional second segment 106 disposed longitudinally-adjacent the first segment. A first end joint 108 is shown as being formed between first and second segments 104 and 106. The first joint can be formed in any suitable manner, such as, for example, by using conventional joint elements 110 and 112 that are respectively attached along portions of the first and second cover segments and interengage one another to at least approximately align the cover segments with one another.

Each cover segment can include one or more cover walls. In some cases, the cover segment could be formed from a single wall that is capable of fully concealing the associated building structure. In such case, a single longitudinally-extending side joint may be formed by portions of the opposing edges of the cover wall. In other cases, however, two or more cover walls can be used to form the cover assembly. In such case, each of the two or more cover walls will be capable of partially concealing the associated building structure and the two or more cover walls, when assembled together to form a cover segment, will extend along or around the associated building structure to at least partially conceal the same. Where two or more cover walls are used, a corresponding number of two or more side joints will be formed by portions of the cover walls that are adjacent one another. Generally, such two or more side joints will extend in a longitudinal direction that is approximately transverse (e.g., perpendicular) to the end joint formed between adjacent cover segments (e.g., end joint 108 between segments 104 and 106).

In the exemplary arrangement shown in FIGS. 1-6, segments 104 and 106 include two cover walls, which are respectively identified by reference numbers 114-120. Side joints 122A and 122B are shown extending longitudinally between cover walls 114 and 116, and side joints 124A-124B are shown extending longitudinally between cover walls 118 and 120.

Each cover wall (e.g., cover walls 114-120) that is used to at least partially form a cover segment (e.g., cover segments 104 and 106) includes an aesthetic portion, which is generally indicated by reference characters A in FIG. 2, and at least one mounting portion that is suitable for use in securing the cover wall on or along the building structure and/or on or along another cover wall. In the arrangement shown, each cover wall includes two mounting portions, generally indicated by reference characters B and C in FIG. 2, that are disposed on opposing sides of the aesthetic portion. It will be appreciated that each cover wall will have opposing surfaces and that, regardless of the shape or configuration of the cover wall, one of these opposing surfaces will, in use, act as the outward or visible surface and the other of the opposing surfaces will act as the inward or hidden surface. As such, each cover wall is shown as including an exterior surface 126 (FIG. 2) and an opposing interior surface 128 (FIG. 2).

An aesthetic cover assembly in accordance with the subject matter of the present disclosure, such as assembly 100, for example, can be supported on or along a building structure, such as structural column COL, for example, in any suitable manner that utilizes one or more alignment pins. For example, an aesthetic cover assembly can include a cover wall that has opposing mounting portions and an aesthetic portion disposed therebetween with the first mounting portion secured on the building structure using conventional fasteners and the second mounting portion supported on alignment pins. As another example, a plurality of cover walls that are each separately supported on the building structure using one or more alignment pins, such as by engaging a mounting portion thereof. As a further example, one or more of the plurality of cover walls could be secured on the building structure using conventional fasteners and one or more of the remaining cover walls could be supported on the building structure and/or other cover walls using one or more of the subject alignment pins. Regardless of the arrangement and/or configuration that is used, however, it will be appreciated that any suitable number of alignment pins can be used to support one or more of the segments and/or cover walls of the aesthetic cover assembly on or along the building structure, such as from 1 to 20 alignment pins per cover wall, for example.

In a preferred arrangement, aesthetic cover assembly 100 includes a first cover wall that is secured to the building structure using conventional mechanical fasteners, such as bolts and nuts, sheet metal screws and/or rivets, for example. A second cover wall is supported on the building structure immediately adjacent and/or in abutting engagement with the first cover wall. In the arrangement shown in FIGS. 2 and 3, cover wall 116 is secured to second brackets BK2 using an internally-threaded tubular fastener 130 that has a head 132 and an elongated tubular body 134 that is shown extending through a hole 136 in the mounting portions (e.g., mounting portions 116B and 116C) of cover wall 116 as well as through a hole 138 extending through the second mounting brackets (e.g., brackets BK2). Mounting portions 116B and 116C are shown as including a recess or counterbore 140 that is suitable for receiving head 132 of tubular fastener 130. This permits the mounting portions (e.g., mounting portions 114B and 114C) of the second cover wall (e.g., cover wall 114) to be supported in abutting engagement with the mounting portions (e.g., mounting portions 116B and 116C) of the first cover wall (e.g., cover wall 116) without interference from heads 132. To secure the first cover wall to the building structure, fastener 130 is axially compressed or otherwise drawn together to generate a retaining bead 142 along the building structure to secure the cover wall and building structure to one another.

One advantage of using an internally-threaded tubular fastener is that the internal threads of the fastener can act as a securement feature for receiving an alignment pin in accordance with the subject matter of the present disclosure. One example of an internally-threaded tubular fastener that could be used is commercially available from Bollhoff Rivnut Inc. of Kendallville, Ind. under the mark RIVNUT. As such, securement features for receiving the one or more alignment pins that are used do not need to be separately provided. It will be appreciated, however, that one or more securement features could be separately provided without departing from the subject matter of the present disclosure.

In a preferred arrangement, the first cover wall (e.g., cover wall 116) is secured on the building structure (e.g., on mounting bracket BK2) in a plurality of places (e.g., from 2 to 20 places) along the longitudinal length of each mounting portion (e.g., mounting portions 116B and 116C) using internally-threaded tubular fasteners. As such, a corresponding number of securement features are provided along the longitudinal length of each mounting portion of the first cover wall. One or more alignment pins can be installed using a corresponding number of one or more of these securement features to support the second cover wall (e.g., cover wall 114).

Figure 4:
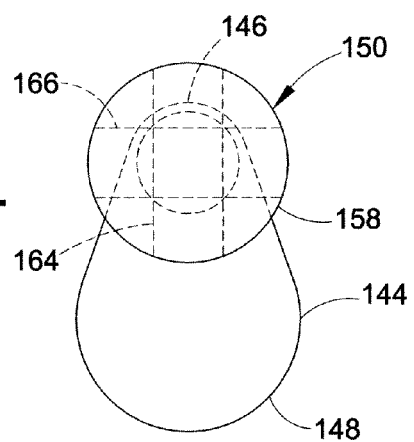
FIG. 4 is a side view of the alignment pin and cover wall opening taken from along line 4-4 in FIG. 3 shown in a fully assembled condition.
Figure 6:
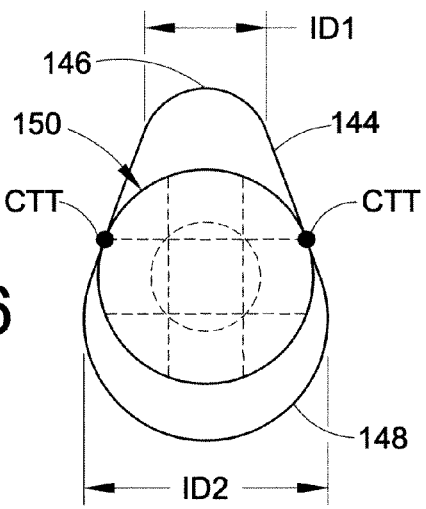
FIG. 6 is a side view of the alignment pin and cover wall opening taken from along line 6-6 in FIG. 5 shown in a partially assembled condition.

To receivably engage and be supported on the one or more alignment pins, as discussed above, the mounting portions (e.g., 114B and 114C) of the second cover wall (e.g., second cover wall 114) preferably include one or more holes or openings 144 extending therethrough. While it will be appreciated that the holes or openings that extend through the mounting portions of the second cover wall can be of any suitable size, shape, configuration and/or arrangement, in one preferred embodiment, holes 144 are elongated in the longitudinal direction of the cover wall (i.e., along axis AX1 in FIG. 1). Additionally, holes 144, in a preferred arrangement, include a first or upper end 146 that has a first inside cross-sectional dimension ID1 and a second or lower end 148 that has a second inside cross-sectional dimension ID2 that is greater than cross-sectional dimension ID1. For example, holes 144 could have key-hole or tear-drop shape, as illustrated in FIGS. 4 and 6.

An alignment pin 150 in accordance with the subject matter of the present disclosure includes an elongated body that extends between opposing first and second ends 152 and 154. The elongated body also includes a first portion 156 disposed toward first end 152 and an second portion 158 that is disposed toward second end 154, with respect to the first portion. First portion 156 has a first outside cross-sectional dimension OD1 (FIG. 5) and includes a securement feature extending or otherwise provided on or along at least a portion thereof, such as, for example, may be suitable for cooperatively engaging the securement features provided on the building structure and/or first cover wall. It will be appreciated that any suitable securement feature can be provided on or along the first portion of the alignment pin, such as a plurality of threads 160, for example. Additionally, a suitable retaining feature, such as a thread-locking nylon patch (not shown), for example, can also optionally be included on the securement feature.

Figure 5:
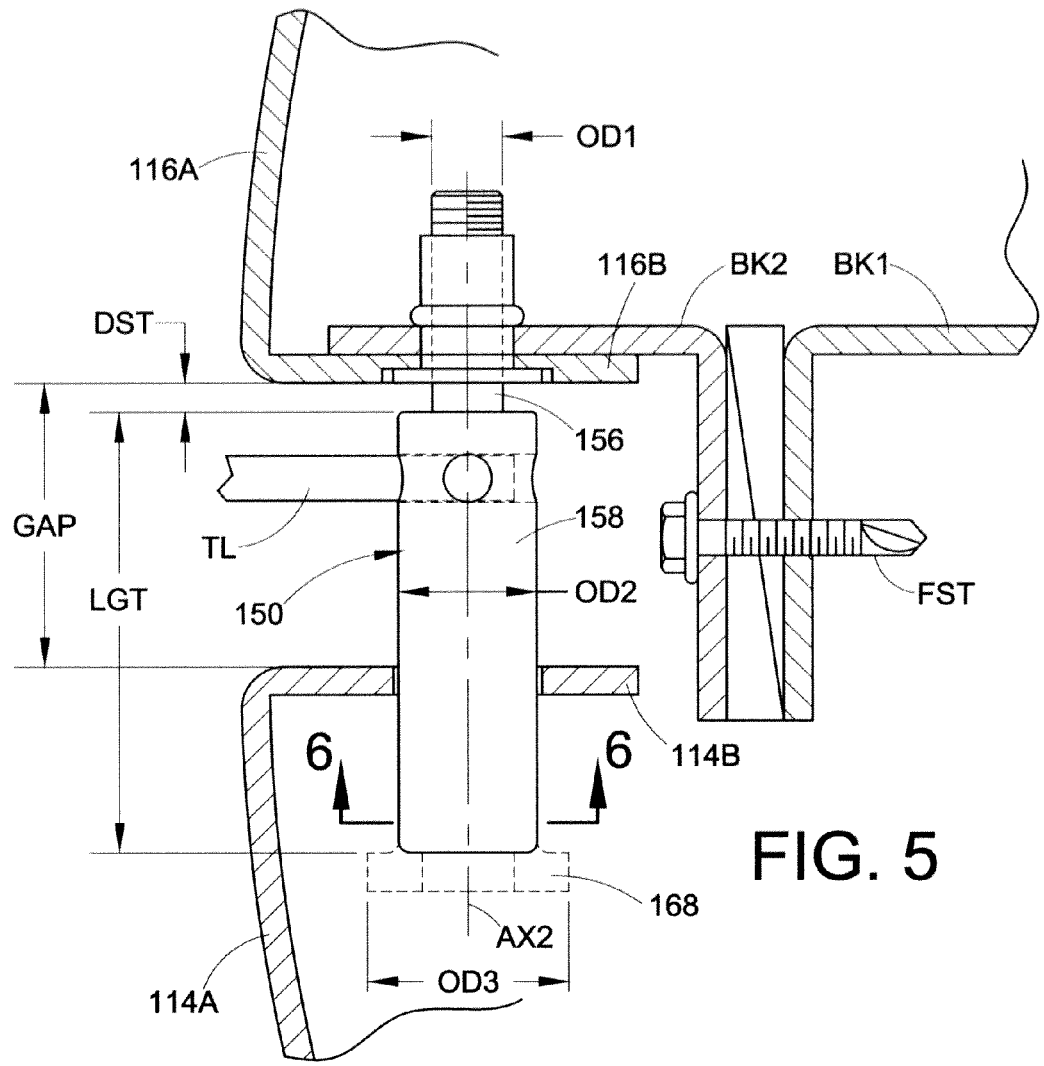
FIG. 5 is an enlarged view of the portion of the aesthetic cover assembly in Detail 3 of FIG. 2 shown partially assembled and undergoing adjustment of the alignment pin.

Second portion 158 of alignment pin 150 has a second outside cross-sectional dimension OD2 (FIG. 5) that is greater than cross-sectional dimension OD1 such that a shoulder 162 is formed between the first and second portions of the alignment pin. First and second portions 156 and 158 of alignment pin 150 are shown as being substantially cylindrical. It will be appreciated, however, that any other shape and/or configuration could alternately be used. As can be more clearly seen in FIG. 5, shoulder 162 is positioned in spaced relation to the mounting surface (e.g., mounting surface 116B) of the first wall (e.g., cover wall 116), as is indicated by reference dimension DST (FIG. 5). In a preferred arrangement, distance DST will be slightly greater than the thickness of the mounting portion of the corresponding cover wall, such that a closely fitted joint can be formed.

It is likely that a situation will arise in which distance DST is less than or undesirably greater than the thickness of the mounting portion or other desirable dimension. In such cases, it will be desirable to adjust the distance (e.g., dimension DST) that the shoulder of the alignment pin (e.g., shoulder 162) is spaced from the adjacent mounting surface (e.g., mounting surface 116B). In a preferred arrangement, any such adjustment can be accomplished by rotating the alignment pin about an axis AX2 extending longitudinally along the alignment pin. In the preferred case, a plurality of interengaging helical threads will be used as securement features on the securement devices that attaching the first cover wall to the building structure as well as on the first portion of the alignment pins. As such, the simple rotation of the alignment pin about axis AX2 can increase or decrease distance DST in the desired direction and by approximately the desired amount.

Alignment pin 150 can also, optionally, include one or more engagement features that may be suitable for use in adjusting the alignment pin, such as has been described above, for example. Any such one or more engagement features, if provided on alignment pin 150, can be of any suitable type, kind, configuration and/or arrangement that is suitable for rotating or otherwise adjusting the alignment pin in the desired manner. For example, a pair of wrench flats could be provided along diametrically opposite portions of an otherwise cylindrical elongated body of the alignment pin. As another example, all or a portion of the second portion of the elongated body could be of a non-circular cross-sectional shape (e.g., hexagonal). As a further example, one or more holes could extend at least partially into the elongated body of the alignment pin, such as may be suitable for use with a spanner wrench, hex wrench, a screwdriver or any other elongated instrument that would fit within the one or more holes. A generic instrument is shown as tool TL in FIG. 5.

In the exemplary embodiment shown in FIGS. 1-6, alignment pin 150 includes a first hole 164 extending through the elongated body in a generally transverse (e.g., approximately perpendicular) orientation to axis AX2. A second hole 166 is also provided that extends through the elongated body in a generally transverse (e.g., approximately perpendicular) orientation to both axis AX2 and to first hole 164. It will be appreciated, however, that any suitable number of one or more holes can be included that extend either partially into or fully through the elongated body of the alignment pin. Additionally, it will be appreciated that the one or more holes can be disposed in any orientation and/or alignment with respect to axis AX2 and to one another. What's more, if two or more holes are provided (e.g., holes 164 and 166), the holes can interconnect with one another or be disposed in spaced relation to one another such that the formation of interconnecting passages through the elongated body is avoided.

Alignment pin 150 can also, optionally, include a third portion 168 that is disposed along toward second end 154 of the elongated body and generally opposite first portion 152. The third portion can be of any suitable shape and/or configuration. In a preferred embodiment, however, third portion 168, if provided, will have a third outside cross-sectional dimension, as is represented by dimension OD3 in FIG. 5, that is greater than cross-sectional dimension OD2 of second portion 158 such that a second shoulder 170 is formed therebetween. Third outside cross-sectional dimension OD3 is also, preferably, less than second inside cross-sectional dimension ID2 such that openings 144 can be received on alignment pins 150 over the third portion, if provided. As described hereinafter, the third portion and second shoulder formed thereby, if provided, are preferably adapted to prevent the mounting portion of the second cover wall supported thereon from inadvertent displacement beyond the longitudinal extent of the alignment pin. Additionally, any suitable features for rotating or otherwise installing the alignment pin can, optionally, be provided on or along third portion 168, such as external flats 172 or an inwardly extending feature (e.g., a slot, Philips head or hex recess).

Generally, it is desirable for the cover wall or walls (e.g., 114 and 116, and/or 118 and 120) that form a cover segment (e.g., segments 104 and 106) to form a closely-fitted joint to aid in overall appearance of the aesthetic cover assembly. One manner in which the desired appearance can be achieved is by installing the subject alignment pins such that shoulder 162 thereof is spaced from the mounting portion (e.g., mounting portion 116B) of the first cover wall (e.g., cover wall 116) by a distance that is just slightly greater than the thickness of the mounting portion (e.g., mounting portion 114B) of the second cover wall (e.g., cover wall 114). Such an arrangement permits the mounting portion of the second cover wall to fit closely between the mounting portion of the first cover wall and the shoulder without creating an interference and without creating excess clearance between the mounting portions of the first and second cover walls.

Variations in the thickness of the mounting portions of the second cover walls, such as may be due to manufacturing tolerances, for example, as well as variations in the positioning of the shoulder from the mounting portion of the first cover wall, such as may occur during installation of the alignment pin, for example, will likely result in the need for adjustments to be made to the position of the shoulder relative to the mounting portion of the first cover wall. It will be appreciated, however, that such adjustments will not be identifiable until the second cover wall is at least partially installed. In known methods of assembly, a trial-and-error approach was used for each of the areas requiring adjustment. That is, the areas in need of adjustment were identified and noted by the installer and the second cover wall was then removed from the installed position. The identified areas were adjusted and the second cover wall was that at least partially re-installed and any further areas requiring adjustment were identified. The process was repeatedly performed until the desired fit and finish was achieved.

Figure 3:
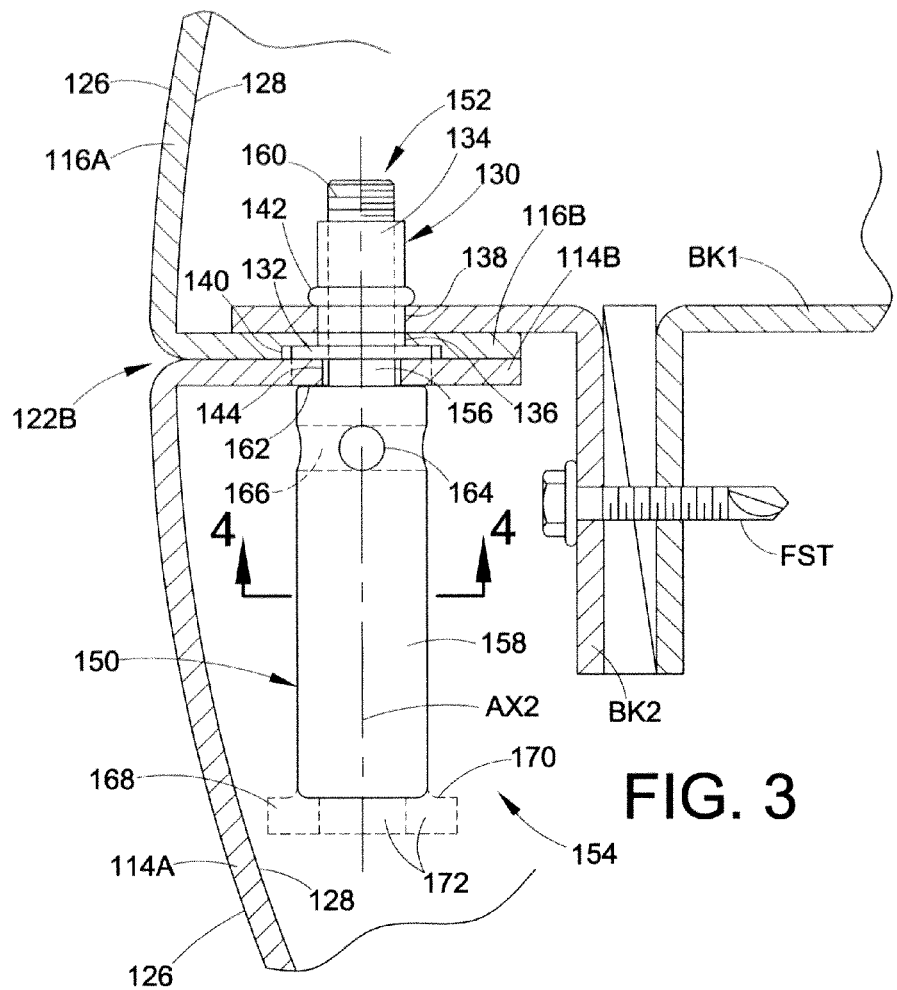
FIG. 3 is an enlarged view of the portion of the aesthetic cover assembly in Detail 3 of FIG. 2 shown in a fully assembled condition.

As shown in FIGS. 5 and 6, however, the use of alignment pins in accordance with the subject concept, such as alignment pins 150, for example, permit adjustments to be made while the second cover wall (e.g., cover wall 114) remains at least partially installed. In an installed condition, the second cover wall is supported on alignment pins 150 by first portions 146 of holes 144 in the mounting portions abuttingly engaging first portion 156 of the alignment pins, as shown in FIGS. 3 and 4. To adjust distance DST, the second cover wall is raised or otherwise slightly displaced until second portions 148 of holes 144 are approximately aligned with second portion 158 of the alignment pins. The second cover wall can then be moved or otherwise positioned in spaced relation to the first cover wall such that a gap or space GAP is formed between the mounting portions (e.g., between mounting portions 116B and 114B) of the first and second cover walls (e.g., cover walls 116 and 114), while holes 144 are engaging alignment pins 150, as indicated by contact points CTT in FIG. 5. It will be recognized from FIG. 5 that if the second portion of the alignment pin is of sufficient length, which is represented by reference dimension LGT in FIG. 5, the gap will be wide enough to provide access to the alignment pins. Thus, adjustments to distance DST can be made while the second cover wall is supported on the alignment pins (i.e., at least partially installed). Second shoulder 170, if provided, can maintain the second cover wall on the alignment pin during adjustment. Additionally, it will be appreciated that the alignment pins can be rotated or otherwise adjusted in any suitable manner, such as by engaging a suitable tool TL with any one or more engagement features (e.g., holes 164 and/or 166) that may be optionally provided on the alignment pins.

Figure 7:
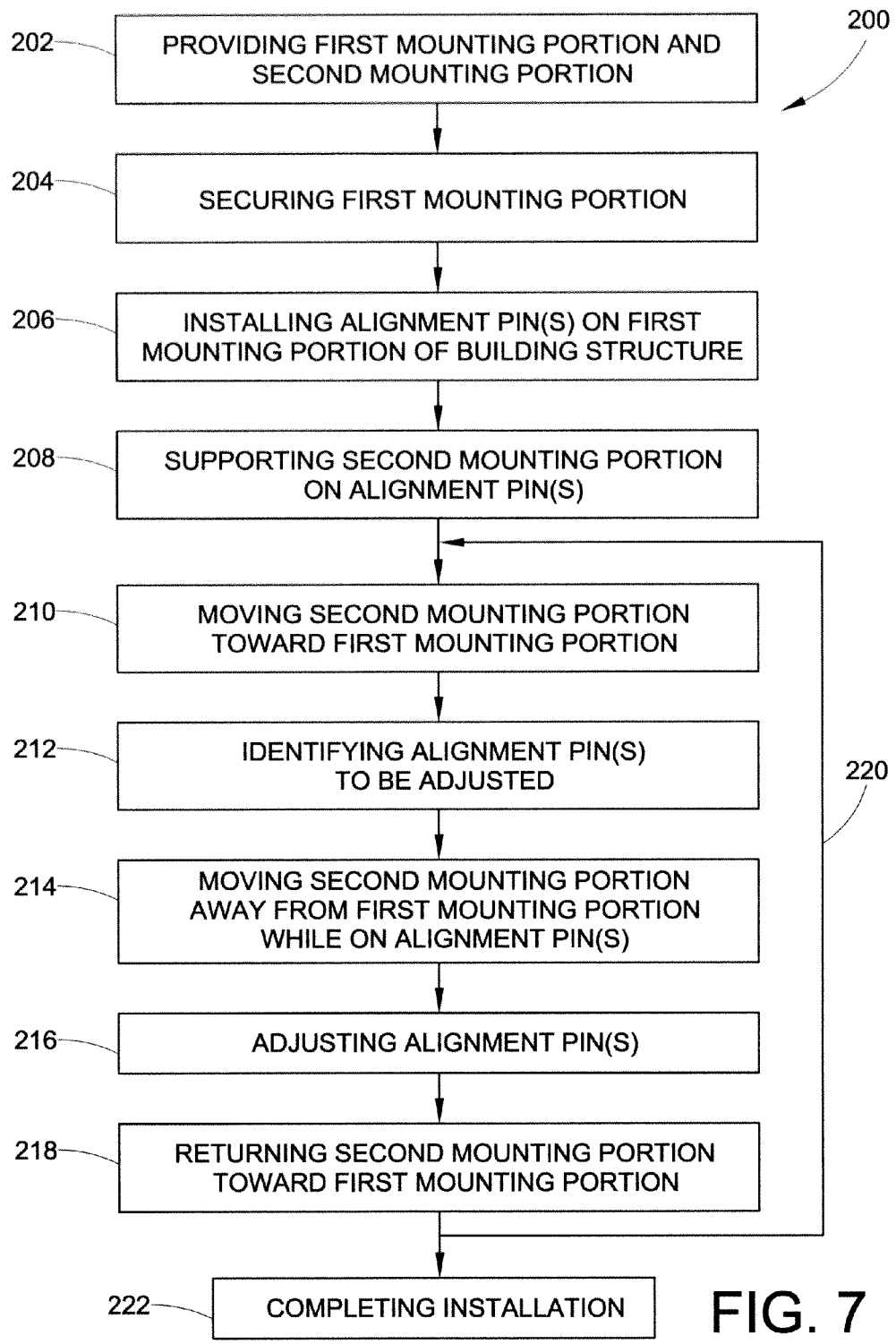
FIG. 7 is a graphical representation of one example of a method of installing an aesthetic cover assembly using an alignment pin in accordance with the subject matter of the present disclosure.

FIG. 7 illustrates one exemplary method 200 of installing an aesthetic cover assembly on a building structure. Method 200 includes providing first mounting portion of a cover wall and a second mounting portion of a cover wall end, as represented by box 202. It will be appreciated that the first and second mounting portions can be from the same or different cover walls. Method 200 also includes securing the first mounting portion of a cover wall on the building structure, as represented by box 204. It will be appreciated that such action can be accomplished in any suitable manner, such as has been previously described, for example. Method 200 further includes providing at least one alignment pin and installing the alignment pin on the first mounting portion of a cover wall and/or the building structure, as represented by box 206. Method 200 also includes supporting the second mounting portion of a cover wall on the at least one alignment pin such that the first and second mounting portions are facing toward one another, as is represented by box 208.

Method 200 further includes positioning the second mounting portion of a cover wall on the alignment pin such that the second mounting portion is in abutting engagement or closely adjacent the first mounting portion of a cover wall, as is represented by box 210. The method also includes identifying the areas for adjustment as well as the direction and/or distance of the adjustment, as is represented by box 212.

Method 200 further includes moving the second mounting portion of a cover wall along the adjustment pin into spaced relation with the first mounting portion of a cover wall to form a gap therebetween, as is represented by box 214. The method still further includes adjusting the alignment pins in the predetermined direction and by approximately the identified amount toward the desired distances, as is represented by box 216, such as by using an optional tool TL, for example. Method 200 also includes returning the second mounting portion of a cover wall into abutting engagement or close position with the first mounting portion of a cover wall, as is represented by box 218. The actions represented by boxes 210-218 can be repeated until the desired fit and finish is achieved, as is indicated by arrow 220. Any further actions can then be performed to complete the installation, as is represented by box 222.

As used herein with reference to certain elements, components and/or structures (e.g., "first mounting portion" and "second mounting portion"), numerical ordinals merely denote different singles of a plurality and do not imply any order or sequence unless specifically defined by the claim language.

While the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject matter of the present disclosure. For example, the disclosed embodiments could be altered to utilize cover assemblies of a square or hexagonal shape, or any other uniform or non-uniform configuration. Additionally, building structures can be vertical columns, horizontal supports and any other load bearing or non-load bearing features regardless of orientation. Furthermore, the disclosed embodiments could also be used on walls, ceilings or other approximately planar applications as well as on or along wall-wall corners and wall-ceiling corners. Thus, modifications and alterations will occur to others upon reading and understanding the preceding detailed description. Accordingly, it is to be distinctly understood that the foregoing descriptive matter is to be interpreted merely as illustrative and not as a limitation. As such, it is intended that the subject matter of the present disclosure be construed as including all such modifications and alterations insofar as they come within the scope of the appended claims and any equivalents thereof.

The invention claimed is:

1. An aesthetic cover assembly for concealing a portion of an associated building structure, said aesthetic cover assembly comprising:
a first mounting portion of a cover wall secured to the associated building structure;
a first securement feature disposed along one of said first mounting portion and the associated building structure;
an alignment pin including an elongated body that extends between opposing first and second ends, said elongated body including a first portion disposed toward said first end and a second portion disposed toward said second end with respect to said first portion, said elongated body including a second securement feature disposed along said first portion that is cooperative with said first securement feature, said first portion of said elongated body having a first outside cross-sectional dimension and said second portion of said elongated body having a second outside cross-sectional dimension that is greater than said first outside cross-sectional dimension such that a shoulder is formed therebetween; and,
a second mounting portion of a cover wall including an opening extending therethrough and adapted to receive said alignment pin;
said alignment pin received on said one of said first mounting portion of a cover wall and the associated building structure with said first and second securement features interengaging one another such that said alignment pin extends away from said first mounting portion of a cover wall and said shoulder is spaced a distance from said first mounting portion of a cover wall.

2. An aesthetic cover assembly according to claim 1, wherein said elongated body includes at least one engagement feature that is adapted for use in adjusting said distance of said shoulder from said first cover wall, said at least one engagement feature being disposed along said elongated body adjacent said shoulder such that said at least one engagement feature is accessible through a gap formed between said first and second mounting portions when said second mounting portion is supported on said alignment pin in spaced relation to said first mounting portion.

3. An aesthetic cover assembly according to claim 2, wherein said at least one engagement feature includes at least one of a hole extending into said elongated body and a plurality of flats disposed in circumferentially-spaced relation to one another on said elongated body.

4. An aesthetic cover assembly according to claim 1, wherein said first mounting portion of a cover wall is a mounting portion of a first cover wall and said second mounting portion of a cover wall is a mounting portion of a second cover wall that is different from said first cover wall.

5. An aesthetic cover assembly according to claim 4, wherein first and second cover walls each includes an aesthetic portion in addition to said mounting portion thereof.

6. An aesthetic cover assembly according to claim 5, wherein:
said mounting portion of said first and second cover walls is a first mounting portion disposed along one edge of said aesthetic portion and said first and second cover walls include a second mounting portion disposed along an opposing edge of said aesthetic portion;
said alignment pin is a first alignment pin and said aesthetic cover assembly further comprises a second alignment pin, said first alignment pin being received on one of said first mounting portion of said first cover wall and the associated building structure, and said second alignment pin being received on one of said second mounting portion of said first cover wall and the associated building structure; and
said first mounting portion of said second cover wall receivably engaging said first alignment pin and said second mounting portion of said second cover wall receivably engaging said second alignment pin.

7. An aesthetic cover assembly according to claim 6, wherein said opening in said second mounting portion is a first opening that extends through said first mounting portion of said second cover wall and said second cover wall includes a second opening that extends through said second mounting portions, said first and second openings being dimensioned to receive said first and second alignment pins.

8. An aesthetic cover assembly according to claim 1, wherein said opening is elongated and extends between opposing first and second opening ends, said first opening end having a first inside cross-sectional dimension that is greater than said first outside cross-sectional dimension of said first portion of said elongated body, and said second opening end having a second inside cross-sectional dimension that is greater than said second outside cross-sectional dimension of said second portion of said elongated body.

9. An aesthetic cover assembly according to claim 8, wherein said first inside cross-sectional dimension of said first opening end is less than said second inside cross-sectional dimension of said second opening end.

10. An aesthetic cover assembly according to claim 1, wherein said shoulder of said alignment pin is a first shoulder, and said elongated body of said alignment pin includes a third portion disposed adjacent said second portion and opposite said first portion, said third portion having a third outside cross-sectional dimension that is greater than said second outside cross-sectional dimension of said second portion such that a second shoulder is formed therebetween, said second shoulder being adapted to prevent said second cover wall from being displaced beyond said second portion while supported on said alignment pin.

11. An aesthetic cover assembly according to claim 10, wherein said opening is elongated and extends between opposing first and second opening ends, said first opening end having a first inside cross-sectional dimension that is greater than said first outside cross-sectional dimension of said first portion of said elongated body, and said second opening end having a second inside cross-sectional dimension that is greater than said third outside cross-sectional dimension of said second portion of said elongated body.

12. An aesthetic cover assembly according to claim 1, wherein said first and second securement features each include a plurality of helical threads that are adapted to interengage one another such said distance of said shoulder from said cover wall can be adjusted by rotating said alignment pin.

13. A method of installing an aesthetic cover assembly on a building structure, said method comprising:
  a) providing a first mounting portion of a cover wall and securing said first mounting portion to the building structure;
  b) providing a first securement feature disposed along one of said first mounting portion and the building structure;
  c) providing an alignment pin that includes an elongated body extending between opposing first and second ends, said elongated body including a first portion disposed toward said first end and a second portion disposed toward said second end with respect to said first portion, said elongated body including a second securement feature disposed along said first portion that is cooperative with said first engagement feature, said first portion of said elongated body having a first outside cross-sectional dimension and said second portion of said elongated body having a second outside cross-sectional dimension that is greater than said first cross-sectional dimension such that a shoulder is formed therebetween;
  d) installing said alignment pin on one of said first mounting portion and the building structure such that said first and second securement features interengage one another with said alignment pin extending away from said first mounting portion and said shoulder is disposed a distance from said first mounting portion;
  e) providing a second mounting portion of a cover wall that includes an opening extending therethrough that is dimensioned to receive said alignment pin, and positioning said second mounting portion on said alignment pin such that said second mounting portion is adjacent said first mounting portion;
  f) identifying a direction for adjustment of said distance of said shoulder from said first mounting portion;
  g) moving said second mounting portion along said adjustment pin into spaced relation with said first mounting portion such that a gap is formed between said first and second mounting portions;
  h) adjusting said distance of said shoulder from said first mounting portion while said second mounting portion is supported on said alignment pin; and,
  i) positioning said second mounting portion between said first mounting portion wall and said shoulder of said alignment pin.

14. A method according to claim 13, wherein adjusting said distance in h) includes inserting a tool within said gap between said first and second mounting portions and rotating said pin to vary said distance in said direction identified in a).

15. A method according to claim 14, wherein said alignment pin includes at least one engagement feature disposed along a second portion of said elongated body, and adjusting said distance in h) includes engaging said at least one engagement feature of said alignment pin through said gap using the tool.

16. A method according to claim 13, wherein said mounting portion of said second cover wall has a nominal thickness and said distance is less than said nominal thickness such that said second cover wall remains supported on said second portion, and adjusting said distance in h) includes varying said position of said to increasing said distance of said shoulder from mounting portion of said first cover wall.

17. A method according to claim 13, wherein said mounting portion of said second cover wall has a nominal thickness and said distance is greater than said nominal thickness such that said second cover wall is supported on said first portion of said alignment pin with excess clearance between said first and second cover walls when said second cover wall is in abutting engagement with said shoulder, and adjusting said distance in h) includes decreasing said distance of said shoulder from mounting portion of said first cover wall.

18. A method according to claim 13, wherein providing a first mounting portion of a cover wall in a) includes providing a first cover wall that includes said first mounting portion and a first aesthetic portion and providing a second mounting portion of a cover wall in e) includes providing a second cover wall that is separate from said first cover wall and includes said second mounting portion and a second aesthetic portion.

* * * * *